Dec. 28, 1943.   B. CASSEN   2,337,800
PLUG-IN TERMINAL FOR ELECTRIC CABLES
Filed June 28, 1940

WITNESSES:

INVENTOR
Benedict Cassen.
BY
ATTORNEY

Patented Dec. 28, 1943

2,337,800

UNITED STATES PATENT OFFICE 2,337,800

PLUG-IN TERMINAL FOR ELECTRIC CABLES

Benedict Cassen, Pittsburgh, Pa., assignor to Westinghouse Electric & Manufacturing Company, East Pittsburgh, Pa., a corporation of Pennsylvania Application June 28, 1940, Serial No. 342,881

5 Claims. (Cl. 173—363)

My invention relates to terminals for insulated conductors and, in particular, to methods of making detachable junctions between very high-voltage insulated electrical cables and apparatus to which they supply current.

One object of my invention is to provide an improved form of detachable terminal-connector for attaching flexible high-voltage cables to X-ray and other apparatus enclosed in tanks in which they are surrounded by insulating fluids.

Another object of my invention is to provide a terminal structure for insulated high-voltage conductors in which the dielectric of the insulation will not be subjected to local concentrations of electric stress of such magnitude as to rupture the insulation at the point of entrance of the conductor to grounded enclosing cases for apparatus being supplied with current.

Still another object of my invention is to provide a form of end terminal for high-voltage insulated cables which is capable of so distributing the electric stress at the point of their entrance into grounded enclosures that local electric stresses capable of rupturing the insulation will be avoided.

Other objects of my invention will become apparent from reading the following specification, taken in connection with the drawing, in which.

It is customary in the X-ray and certain other arts employing extra high voltages, i. e., voltages of the order of hundreds of thousands of volts, to conduct high-voltage current from certain stationary portions of the apparatus to other portions of the apparatus which must be movable relative thereto. This is frequently done by employing flexible copper cables surrounded by thick walls of rubber or other suitable insulation. It is often useful to provide such cables with separate terminals, often of the well known plug-in type, by which they may be disconnected at will from the apparatus to which they carry current. Such cables are usually covered on the outside of the insulation with a braided metal sheath which is grounded, and it is also frequently the practice to enclose the high-voltage apparatus which the cables supply in metal containers filled with oil or other insulating fluid, and to ground these metal containers. As a result of this situation, a problem arises in preventing dangerous concentrations of electric stress at the point of entrance of the cable through the walls of the metal casing. It is necessary to remove the grounded metal braid from the outside of the cable for some distance from its terminus in order to provide a sufficient creepage distance along the outer surface of the rubber insulation, so that arc-over will not occur between the high-voltage terminal of the cable conductor and the grounded sheath. It is also necessary to provide sufficient creepage distances along the surface of the members which support the terminals of the high-voltage apparatus within the container to sufficiently insulate the latter from the grounded enclosing casing.

The very fact that the cable terminal is to be removable from the container means that there must be clearance spaces between the outside of the cable and any member permanently attached to the container wall within which the cable is to be inserted, and even where such clearances are made as small as is mechanically practicable, a certain amount of air-filled space must exist. The rubber covering of the cable can successfully withstand severe electrical stress without deteriorating, but wherever such an air-filled space as has just been mentioned intervenes in the path of the electric flux, a deteriorating action, probably chemical, is found to destroy the insulating properties of the rubber, unless the stress through the air-filled space is kept below an inconveniently low value. Furthermore, where an electric field passes through two layers of insulating material which have different specific inductive capacities, the stress tends to concentrate in the dielectric having the lower specific inductive capacity, and, in the particular case just mentioned, air has a much lower specific inductive capacity than does the rubber insulation which coats the cable.

Figure 2:
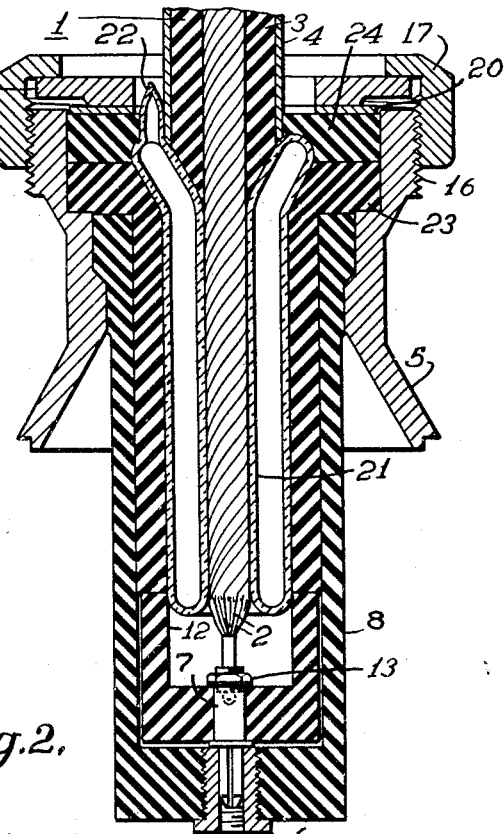
Fig. 2 is a similar view, partly in cross-section, showing a different modification of my invention.
Figure 3:
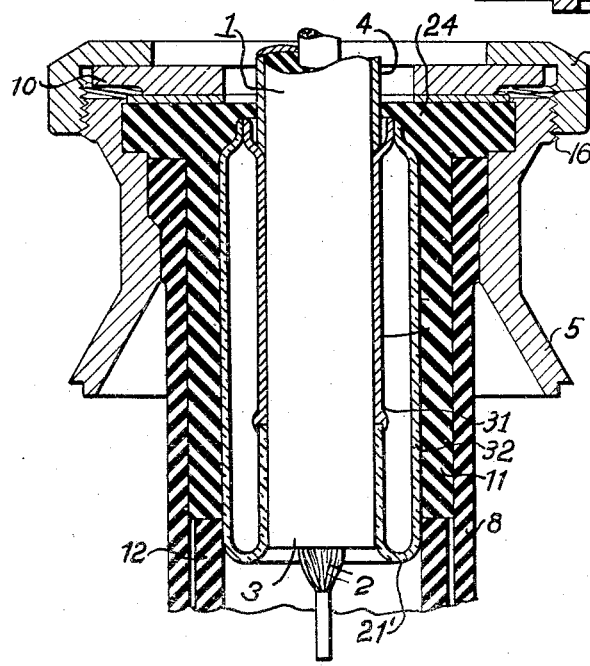
Fig. 3 is a similar view, partly in cross-section, showing still a third modification of my invention.

In view of all the foregoing facts, a serious problem arises in devising methods of insulating the above-mentioned cable terminal in such a way as to keep the diameter of the terminal bushing within reasonable bounds of size. In accordance with my invention, I provide an improved method of solution of the above-mentioned difficulties, in some cases by providing a compressible rubber filler which is forced to completely fill the entire clearance space between the cable and the grounded metal container at all points where the electric stress is high, and in other modifications interposing a highly evacuated annular sheath between the cable and the grounded container wall at those points where the electric stress tends to concentrate. The first of the above-mentioned expedients is illustrated in Fig. 1, while the second expedient is illustrated in Figs. 2 and 3 of the drawing.

Figure 1:
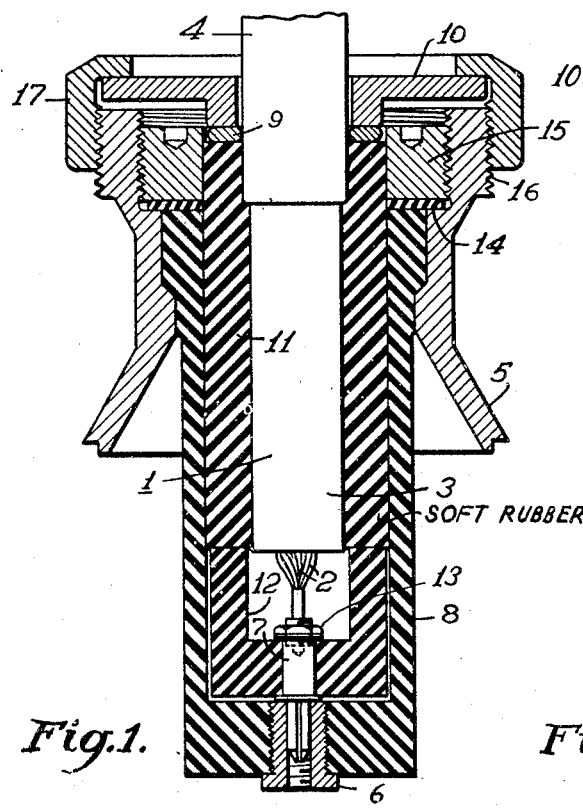
Figure 1 is a view, partly in cross-section, showing one modification of my invention.

Referring in detail to Fig. 1, an electric cable 1 having a core of spiralled copper conductors 2 of conventional type has a thick wall of rubber or other suitable insulating material 3 which is covered by a braided metal sheath 4. The cable 1 is to be used to supply current to an X-ray or other apparatus (not shown) which may be maintained under oil or other suitable insulating fluid within a grounded metal container 5. In order that the cable may be removed at will from connection to the apparatus within the container 5, a separable plug-in is provided, comprising a connecting member 6 which is connected to the apparatus within the container 5 and a conducting terminal 7 which is soldered or otherwise suitably attached to the cable-conductors 2. The connecting member 6 is supported from the container 5 by a member 8 which may be of micarta or other suitable insulating material. The rubber insulation 3 of the cable is removed from the conductors 2 for a sufficient distance from their ends to permit the latter to be soldered or otherwise attached to the conducting terminal 7, and the metal braid 4 is removed from the surface of the rubber insulation 3 for a sufficient distance from the end of the latter to avoid any danger of electrical creepage over the surface of the rubber from the high-voltage conductor 2 to the grounded sheath 4. A washer 9 of rubber or other suitable material and a metallic pressure-ring 10 are slipped over the outside of sheath 4. A sleeve 11 of soft rubber of high insulating power is pulled over the exposed insulation 3 and the lower end of the sheath 4. A cap 12 which may likewise be of micarta or other suitable insulating material, is affixed by a nut 13 or other suitable means to the conducting terminal 7. The upper end of the cap 12 extends to a point just above the lower end of the insulating coating 3 and after the cap 12 is fixed in position on the conducting terminal 7, the space between the conductors 2 and the inner wall of the cap 12, may be filled with beeswax or other suitable insulating material.

As a result of the foregoing construction, it will be seen that the members 7 and 12 form a solid ending for the cable 1 which is continuous with the rubber insulation 3 at the lower end of the latter.

A washer 14 of rubber or other suitable material and a threaded ring 15 of metal may be used to affix the member 8 to the container 5. The threaded ring 15 is adapted to engage screw threads on the annular face of the container 5 and thus acts to hold the member 8 firmly affixed to the container 5. The outer face of the container 5 is likewise provided wtih a threaded portion 16 which is adapted to be engaged by an annular member 17. As soon as the conducting terminal 7 is pushed into position, the washer 9 and pressure ring 10 are pushed down onto the upper end of the sleeve 11 and, by screwing down the nut 17, are forced to compress the sleeve 11 so that it completely fills the entire space between the upper portion of the member 8 and the rubber coating 3 of the cable 1.

Since the sheath 4 of the cable and the container 5 are at ground potential, there is no electric stress in the space surrounding the sheath 4 in the region above its lower end. There is likewise no considerable concentration of electric stress between the high-voltage conductors 2 and the container wall 5 in the region of the cap 12 because of the long distance which intervenes between the conductors 2 and the wall 5 in that region. The principal concentration of electric stress, therefore, occurs in the narrow neck of the container 5 below the end of the metal sheath 4, because it is at this point that the conductors 2 approach most closely to the container wall 5. In this critical region, the pressure exerted by the pressure-ring 10 on the sleeve 11 forces the latter to completely fill the space between the insulating sheath 3 of the cable and the member 8, thereby, in effect, filling the entire space between the conductors 2 and the narrow neck of the container 5 with solid insulating material and removing the possibility of deleterious chemical action from air subjected to dielectric stress.

Referring to the modification of my invention shown in Fig. 2, the rubber insulation 3 is removed from the conductors 2 for a substantial distance above the lower end of the latter. Preferably the rubber is cut away, leaving a tapered margin as shown in Fig. 2. The lower end of the conductors 2 is, as in Fig. 1, attached to a conducting terminal 7 which cooperates with a stationary connecting member 6 supported on a micarta member 8 affixed to the wall of the grounded metal container 5. A pressure-ring 20 which may be of metal is slipped over sheath 4. Closely surrounding the bared portion of the conductors 2 is an annular glass sleeve 21 having its upper end preferably flared at the same angle as the taper which is given to the lower margin of the rubber coating 3. The glass sleeve 21 is highly evacuated in accordance with known methods of modern high-vacuum technique, being sealed off from the pumping system at a tubulation 22.

The glass sleeve 21 is placed in position, fitting as closely as possible to the lower margin of the rubber insulation 3, and, if necessary, the space between the two is filled with rubber cement, or other insulating cement. A flanged sleeve 23 which may, if desired, be made of micarta, is slipped into position to closely fit the sleeve 21. The length of the sleeve 23 is such as to extend substantially to the lower end of the cylindrical outer wall of the sleeve 21. A micarta cap 12 is attached as in Fig. 1 to the conducting terminal 7, being so dimensioned as to extend substantially to the lower end of the cylindrical outer wall of sleeve 21. The space within the cap 12 between the conductors 2 and the lower end of sleeve 21 may be filled with beeswax or other suitable insulating material.

The outer surface of the upper end of the container wall 5 is provided with a threaded portion 16 adapted to be engaged by an annular nut 17 which is slipped over the end of the cable 1. A washer 20 and a pressure-ring 10 are likewise slipped over the cable before the conducting terminal 7 is pushed into operating position.

When it is desired to attach the cable in operative relation with the apparatus in the grounded container 5, the conducting terminal 7 is pushed home and the nut 17 is tightened down, forcing the pressure-ring 10 and the washer 20 to exert pressure through members 23 and 24 upon the conducting terminal 7 to force it into member 6.

By reason of the fact that a highly evacuated space, such as that within the sleeve 21, has a very low specific inductive capacity, the greater part of the potential gradient between the conductor 2 and the container 5 at the narrow neck portion of the latter will be concentrated across the high-vacuum interior of the sleeve 21. Such a highly evacuated space has a very high dielectric strength, and as a result of this arrangement, the distance from the grounded wall 5 and the high voltage conductor 2 at their closest adjacent point may be made relatively small. Correspondingly, the dimensions of the container 5 at the conducting terminal may be reduced to a minimum. By reason of the wide spacing between the conductor 2 below the lower end of the sleeve 21 and the grounded wall 5 of the container, no high concentration of electric stress occurs to cause difficulty at that point. On the other hand, the entire electric stress is concentrated between the conductors 2 and the grounded sheath 4 at all points above the lower end of the latter, so that no difficulty from dielectric breakdown can occur above the upper end of the sleeve 21.

Referring particularly to Fig. 3, the sleeve 21' may advantageously be made partially of metal 31 and partially of glass 32 instead of having walls entirely of glass, as shown in Fig. 2. In such case, the braided metal sheath 4 is electrically connected to the wall portion 31 of the sleeve, and the metal portion 31 thus, in effect, constitutes an extension of the metal sheath 4 within which all the electric stress surrounding the conductors 2 is concentrated. The lower end of the metal portion 31 is far enough above the lower end of the rubber insulation 3 on the cable to provide a sufficient creepage distance along the surface of the latter from the grounded portion 31 to the high-voltage conductors 2. The distance from the conductors 2 to the cell wall 5 in the region below the lower end of sleeve 32 is great enough so that no high electric stress is present to cause difficulties. The wall portion 31 may, if desired, be formed entirely of the alloy Kovar, described in Howard Scott Patent No. 2,062,335, assigned to Westinghouse Electric & Manufacturing Company, of East Pittsburgh, Pa. Alternatively, the member 31 may be formed of some other metal such as iron, but provided with a facing of the alloy Kovar at the portions which seal to the glass 32. The latter may be a borosilicate glass, such, for example, as Corning glass G705AJ.

In accordance with the patent statutes, I have described a particular embodiment of my invention, but it will be recognized that the principles thereof are of broad application in ways which will be evident to those skilled in the art.

I claim as my invention:

1. A plug-in terminal comprising an electrical conductor, an insulating housing therefor, said conductor provided with a coating of insulating material, a grounded conducting sheath covering said coating except for a limited portion adjacent the end of said conductor, a conducting terminal at the end of said conductor, an insulating member extending substantially from said conducting terminal to the insulated coating on said conductor, a sleeve of compressible insulating material on said insulating coating extending from said insulating member to a point beyond the end of said conducting sheath, and means secured to said housing to exert longitudinal compressive force on said sleeve between said insulating member and the end thereof nearest said conducting sheath.

2. Means for making a detachable connection of an electrical conductor having an insulated coating to apparatus enclosed within a metal container which comprises a connecting member insulatingly supported from said container by a cylindrical hollow insulator, said insulator being dimensioned to support said member at a point sufficiently remote from the walls thereof to prevent arc-over between said member and said walls, a conducting terminal connected to the end of said conductor and adapted to engage said member when the conductor and end terminal are positioned in the hollow insulator, a cap of insulating material intervening between said terminal and said coating, said cap having a diameter greater than the outside diameter of said coating and substantially equal to the inside diameter of said cylindrical insulator, a sleeve of compressible insulating material on said insulating coating and extending from said cap to a pont near the outer edge of said container, and a means engaging said container wall and adapted to exert longitudinal pressure on said sleeve to compress it in the space between the insulated coating and wall of the hollow insulator.

3. A plug-in terminal connection for electrical apparatus enclosed within a metal container comprising an annular projection extending from the wall of said container, a cylindrical insulator fastened at its upper end to said projection and having its lower end closed and provided with a connecting member adapted to be connected to electrical apparatus within said container and also to constitute one member of a plug-in connection, the air-line distance from said member to said wall being substantially greater than the radius of said projection, an electrical conductor having an insulating coat and a conducting sleeve surrounding said coat except for a portion in the region of the end of said conductor, a conducting terminal for said plug-in connection attached to the end of said conductor and surrounded by a cylindrical insulating cap and contiguous to the latter, a sleeve of compressible insulating material extending from said cap to a point beyond the end of said conducting sheath, a pressure ring adapted to exert longitudinal pressure on said sleeve, and a threaded member engaging said projection and adapted to exert pressure on said pressure ring to compress said sleeve.

4. Means for making a detachable connection of an electrical conductor having an insulated coating to apparatus enclosed within a metal container which means comprises a connecting member insulatingly supported from said container by a cylindrical hollow insulator, said insulator being dimensioned to support said member at a point sufficiently remote from the wall of said container to prevent arc-over between said member and said wall, a conducting terminal connected to the end of said conductor and adapted to engage said connecting member, a sleeve of compressible insulating material on said insulating coating and extending from a point near said conducting terminal to a point near the outer edge of container opening, and a means engaging said container wall and adapted to exert longitudinal pressure on said sleeve.

5. Means for making a detachable connection of an insulated electrical conductor to apparatus enclosed within a metal container, said insulated conductor having an outer conducting sheath for electrical connection to said container, which means comprises an insulating housing, an electrical connecting member at one end of said housing, a conducting terminal connected to the end of said conductor and adapted to engage said connecting member within said insulating housing, a cap of insulating material intervening between said terminal and said conductor insulation, a sleeve of compressible insulating material on said insulating coating and extending from said cap to a point beyond the end of said conducting sheath, and a means engaging said container and adapted to exert longitudinal pressure on said sleeve.

BENEDICT CASSEN.